(12) United States Patent
Kurauchi

(10) Patent No.: US 8,950,538 B2
(45) Date of Patent: Feb. 10, 2015

(54) WORKING MACHINE

(71) Applicant: Kobelco Construction Machinery Co., Ltd., Hiroshima-shi (JP)

(72) Inventor: Katsuya Kurauchi, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 13/835,447

(22) Filed: Mar. 15, 2013

(65) Prior Publication Data

US 2013/0257095 A1 Oct. 3, 2013

(30) Foreign Application Priority Data

Mar. 29, 2012 (JP) ................................ 2012-076654

(51) Int. Cl.
| | | |
|---|---|---|
| B62D 33/00 | (2006.01) | |
| E02F 3/85 | (2006.01) | |
| E02F 9/00 | (2006.01) | |
| F16L 3/00 | (2006.01) | |
| E02F 9/08 | (2006.01) | |
| E02F 9/22 | (2006.01) | |

(52) U.S. Cl.
CPC ... *E02F 9/08* (2013.01); *E02F 9/00* (2013.01); *E02F 9/2275* (2013.01)
USPC ....... 180/89.1; 180/89.13; 172/813; 248/68.1

(58) Field of Classification Search
USPC .................. 180/89.1, 89.13, 89.16, 311, 313; 172/813; 248/56, 68.1, 70, 73, 74.4, 248/316.6
See application file for complete search history.

(56) References Cited

U.S. PATENT DOCUMENTS

| | | | | |
|---|---|---|---|---|
| 3,422,729 | A | * | 1/1969 | Kirchler ........................... 92/146 |
| 3,727,699 | A | * | 4/1973 | Baker et al. .................... 172/813 |
| 4,111,268 | A | * | 9/1978 | Frisbee ........................ 172/813 |
| 4,554,979 | A | * | 11/1985 | Foley et al. .................... 172/813 |
| 4,572,302 | A | * | 2/1986 | Frisbee ........................ 172/813 |
| 5,205,520 | A | * | 4/1993 | Walker ........................ 248/74.1 |
| 6,752,360 | B2 | * | 6/2004 | Bennett ....................... 248/68.1 |
| 7,478,783 | B2 | * | 1/2009 | Royer ......................... 248/74.1 |
| 7,854,284 | B2 | * | 12/2010 | Wada et al. ................. 180/89.13 |
| 8,342,474 | B2 | * | 1/2013 | Gilbreath ...................... 248/558 |

(Continued)

FOREIGN PATENT DOCUMENTS

JP 2011-163035 8/2011

OTHER PUBLICATIONS

Machine translation of JP 2011-163035.*

*Primary Examiner* — Paul N Dickson
*Assistant Examiner* — Barry Gooden, Jr.
(74) *Attorney, Agent, or Firm* — Oblon, Spivak, McClelland, Maier & Neustadt, L.L.P.

(57) ABSTRACT

Disclosed is a working machine which comprises: a lower propelling body; a support base; an equipment installation area; a pipe extending from the equipment installation area; a guard which covers the equipment installation area and has an opening for leading out the pipe therethrough; and a clamp configured to support the pipe and having a shape capable of closing up the opening. The clamp includes: at least one support element for supporting the pipe; a guide portion for guiding the at least one support element; and a pair of clamping members for clamping the at least one support element. One of the pair of clamping members has a shield plate portion having a shape capable of closing up a remaining region of the opening other than a region closed up by the at least one support element arranged.

4 Claims, 8 Drawing Sheets

(56) References Cited

U.S. PATENT DOCUMENTS

| | | | |
|---|---|---|---|
| 2006/0249636 A1* | 11/2006 | Thiedig et al. | 248/74.4 |
| 2012/0280092 A1* | 11/2012 | Barre et al. | 248/68.1 |
| 2013/0214100 A1* | 8/2013 | Edmond et al. | 248/74.4 |

* cited by examiner

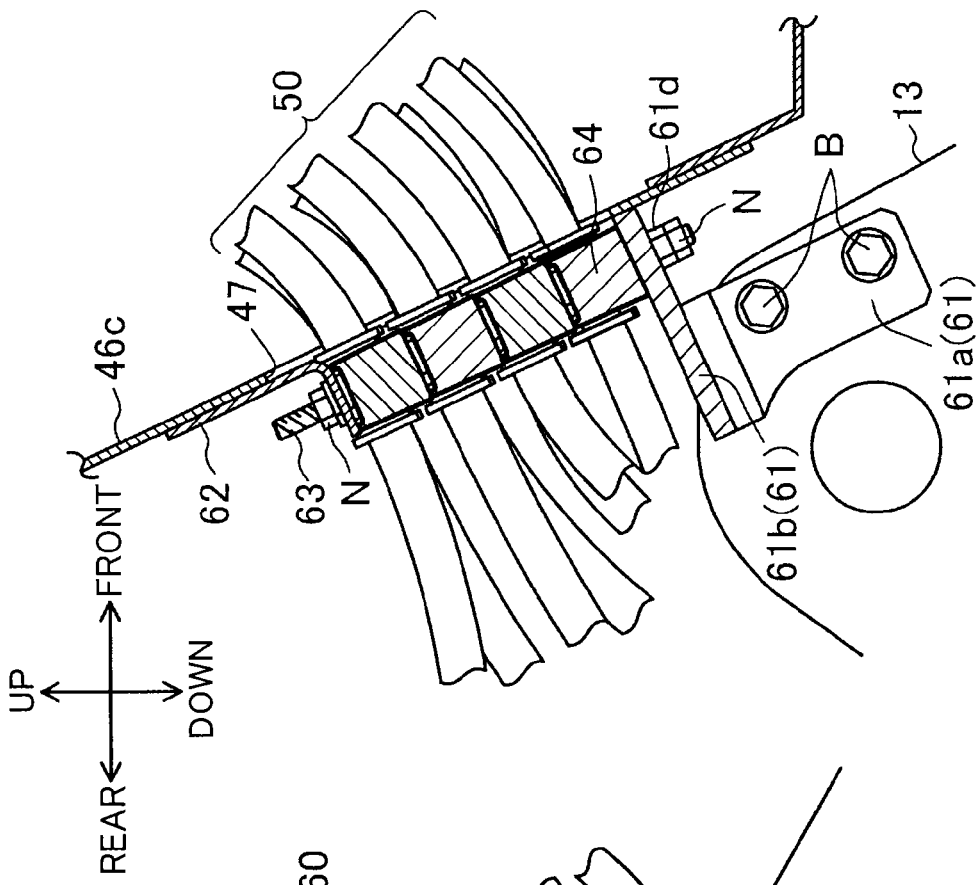
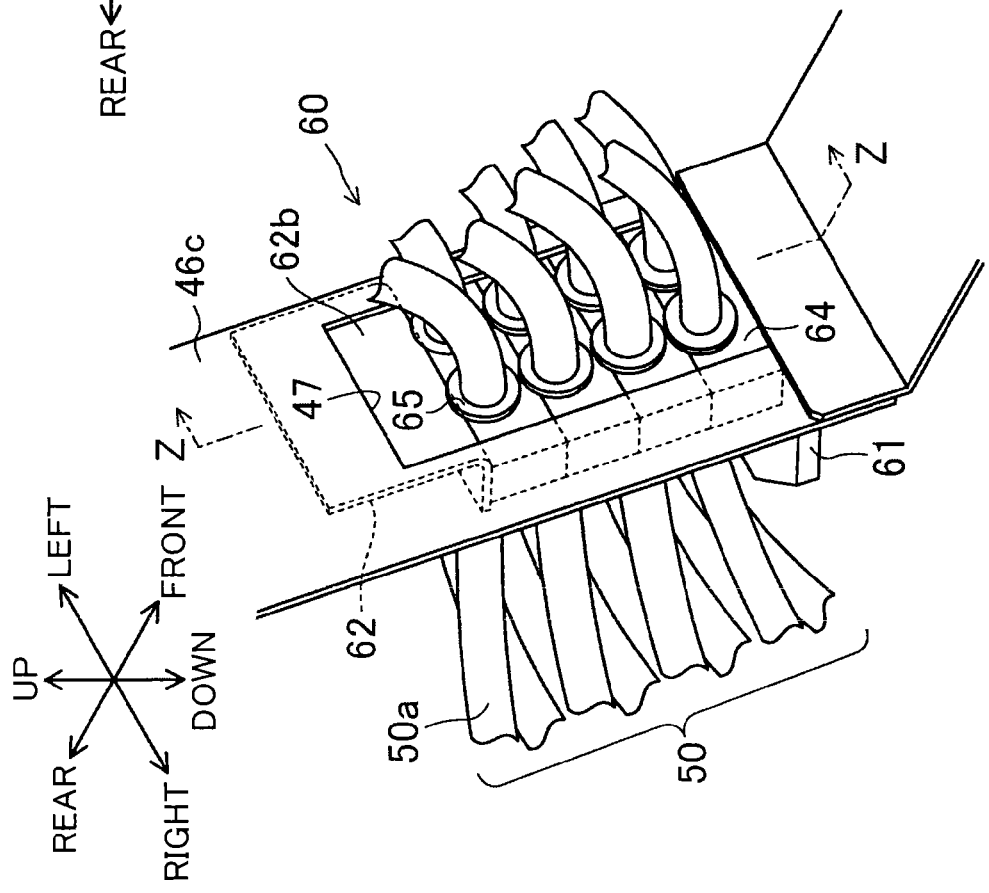

WORKING MACHINE

BACKGROUND OF THE INVENTION

1. Field of the Invention

The present invention relates to a working machine such as a hydraulic shovel, and more specifically to a structure of a clamp which requires a function of supporting a pipe such as a hydraulic hose, and a shielding function.

2. Description of the Background Art

As one example of this type of clamp, JP 2011-163035A (hereinafter referred to as "Patent Document 1") discloses a hose fixing device installed in a boundary region between a housing cover of a construction machine and an outside of the housing cover.

The housing cover is formed with a rectangular opening opened in a right direction, and the hose fixing device is installed to close up the opening. The hose fixing device comprises: two guide rods extending in the right direction from respective positions spaced apart from each other in a front-rear direction, in a mounting plate located on a left side of the opening; first to third clamps each made of rubber and formed in a different shape which is long in the front-rear direction; a clamping bracket; and two fixing bolts.

Each of the first and second clamps is formed with three hose fitting concave portions, and a hydraulic hose is press-fitted into each of the hose fitting concave portions. The first to third clamps are joined together in the right lateral direction in a state in which the guide rods are inserted, respectively, into opposite front and rear ends of each of the first to third clamps.

The clamping bracket is fastened to the guide rods by the fixing bolts, while being pressed against the rightmost third clamp, and further bolted and fixed to two threaded seat plates provided, respectively, on front and rear sides of the opening.

In the above hose fixing device, in order to shield the opening, a size of the opening, a length of each of the guide rods, positions of the threaded seat plates and others are designed in conformity to the overall shape and size of the first to third clamps. Therefore, when a need for addition of a hydraulic hose arises, the overall structure of the opening and others has to be changed. Thus, it is not easy to respond to the need.

For example, although the Patent Document 1 mentions that the number of the clamps may be increased up to four or more, the housing cover, the guide rods and others have to be replaced with different ones in conformity to a change in the number of the clamps.

The addition of a hydraulic hose can be performed without replacement of the housing cover and others, by increasing the number of the hose fitting concave portions. However, in this case, it is necessary to prepare a new clamp. Moreover, an increase in the number of the hose fitting concave portions causes deterioration in strength of the clamp, which leads to instability in support of hydraulic hoses.

SUMMARY OF THE INVENTION

It is an object of the present invention to provide a working machine capable of facilitating the addition of a pipe without impairing a shielding function.

According to one aspect of the present invention, there is provided a working machine which comprises: a lower propelling body; a support base supported by the lower propelling body; an equipment installation area provided on the support base to allow equipment to be installed therein; a pipe extending from the equipment installation area; a guard which covers the equipment installation area and has an opening for leading out the pipe therethrough; and a clamp configured to support the pipe and have a shape capable of closing up the opening, wherein the clamp includes: at least one support element for supporting the pipe; a guide portion for guiding the at least one support element so as to allow the at least one support element to be arranged side-by-side in a row along a specific direction; a pair of clamping members for clamping the at least one support element from respective opposite sides in the specific direction, and wherein one of the pair of clamping members has a shield plate portion having a shape capable of closing up a remaining region of the opening other than a region closed up by the at least one support element arranged under a condition that the number thereof is set within a specific value.

BRIEF DESCRIPTION OF THE DRAWINGS

FIGS. 4A and 4B illustrate a clamp, wherein FIG. 4A is a perspective view, and FIG. 4B is a sectional view taken along the line Y-Y in FIG. 4A.

FIGS. 7A and 7B illustrate one example of the clamp in the case where the addition of pipes is performed, wherein FIG. 7A is a perspective view, and FIG. 7B is a sectional view taken along the line Z-Z in FIG. 7A.

DETAILED DESCRIPTION OF THE PREFERRED EMBODIMENTS OF THE INVENTION

With reference to the accompanying drawings, the present invention will now be described based on an embodiment thereof. In each figure, front, rear, right, left, up and down directions are indicated. Unless otherwise stated, directions such as a front-rear direction in the following description are defined according to these indications. It should be understood that the following embodiment is a specific example of the present invention, and is not intended to restrict a technical scope of the present invention.

Figure 1:
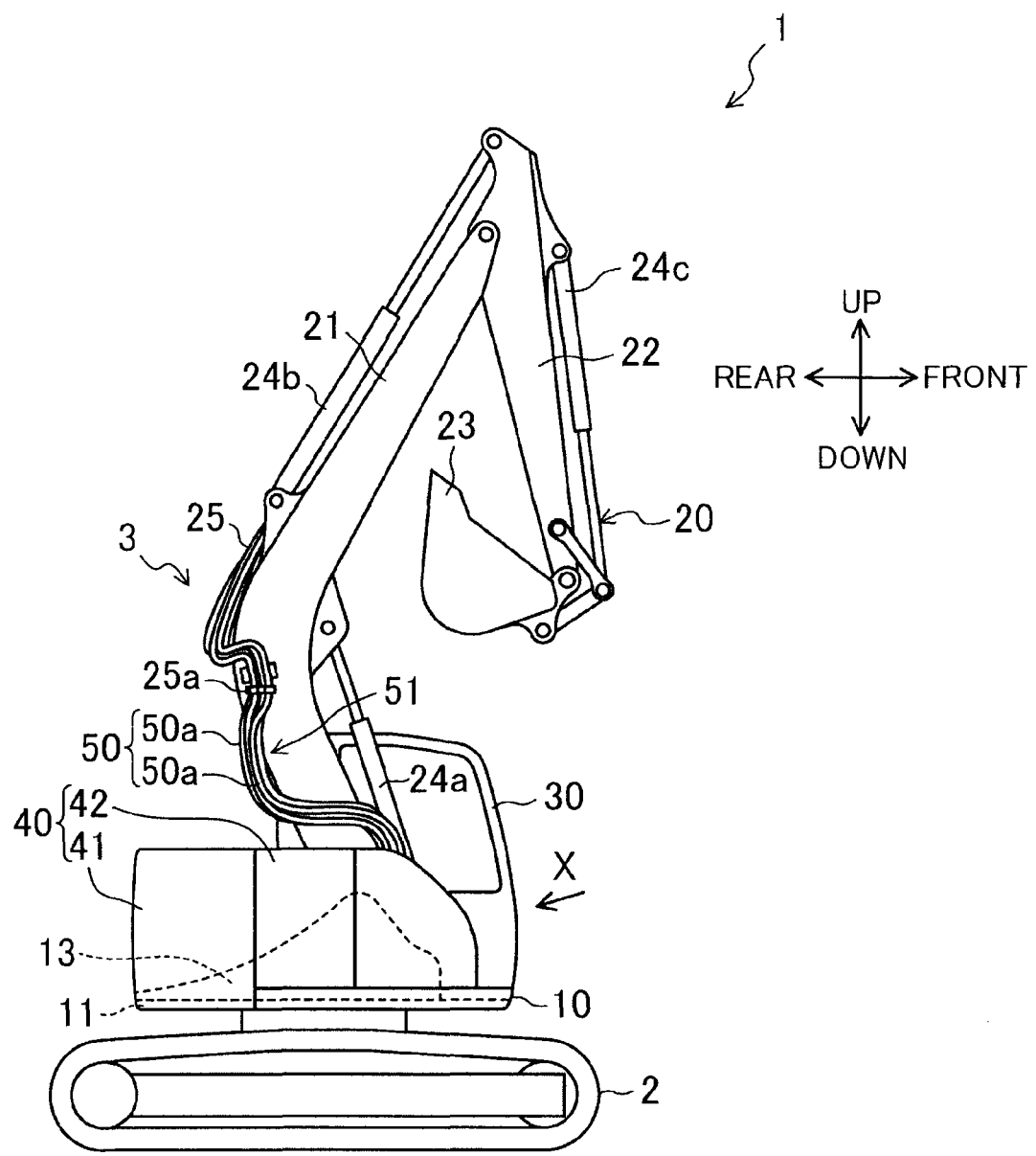
FIG. 1 is a schematic side view illustrating a working machine according to one embodiment of the present invention.
Figure 2:
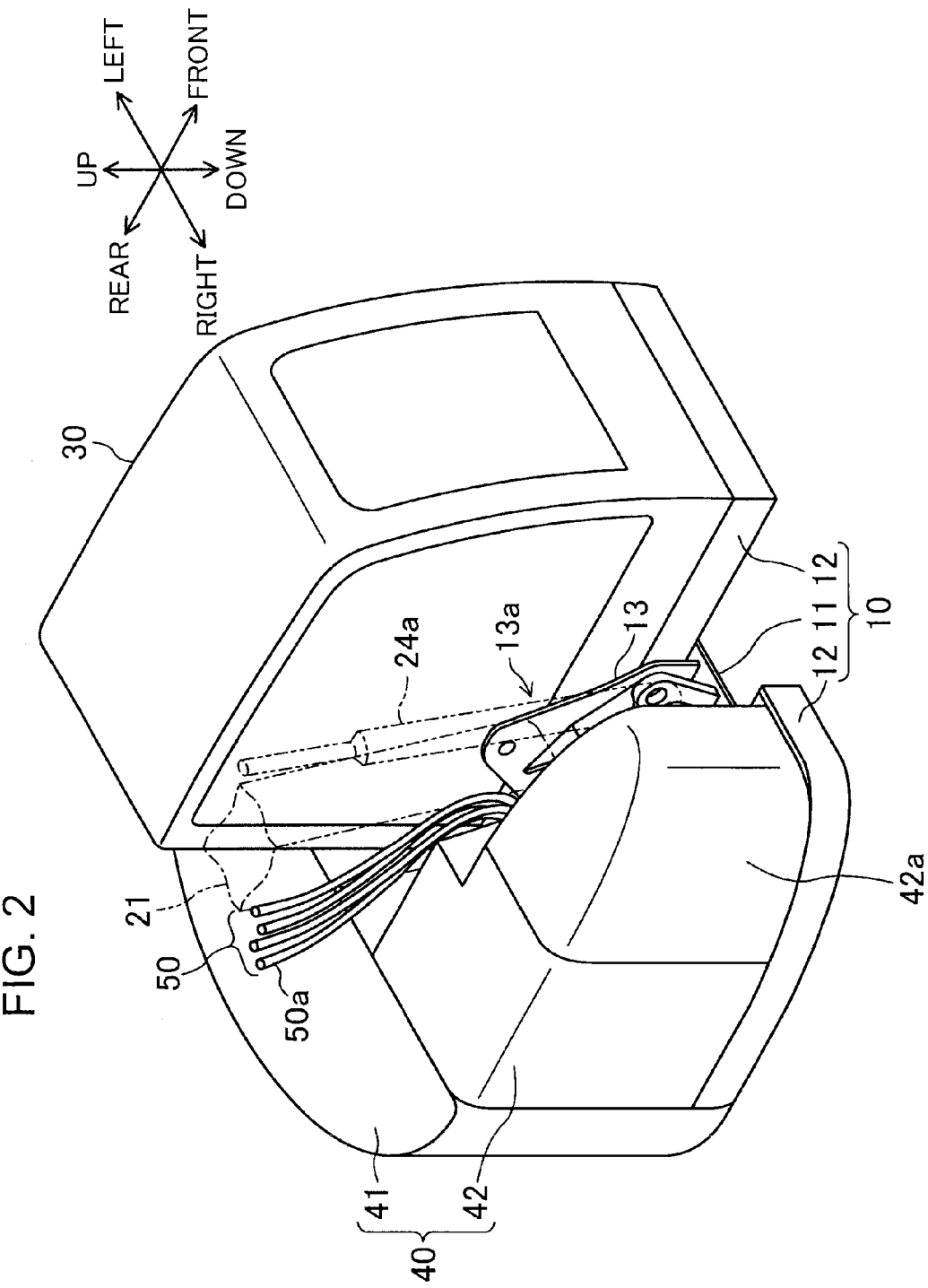
FIG. 2 is a schematic perspective view illustrating a machine body of the working machine, when viewed in the direction of the arrow X in FIG. 1.

FIGS. 1 and 2 illustrates a hydraulic shovel 1 (one example of a working machine) employing the present invention. The hydraulic shovel 1 comprises a crawler type lower propelling body 2, and a machine body 3 slewably mounted on the lower propelling body 2. The machine body 3 comprises a support base 10, an attachment 20, a cab 30, and an equipment compartment 40.

The support base 10 forms a bottom wall of the machine body 3, and is supported on the lower propelling body 2 in a slewable manner with respect to the lower propelling body 2. The support base 10 has a bottom plate 11 composed of a thick-walled steel plate, and right and left side decks 12 protruding from the bottom plate 11 in right and left directions, respectively.

A pair of vertical plates 13, 13 each composed of a thick-walled steel plate are provided on an upper surface of the bottom plate 11 to stand vertically upwardly. The vertical plates 13 extend in a front-rear direction, in opposed relation to each other in a right-left direction. Each of the vertical plates 13 has a support portion 13a provided on a front side thereof to support attachment 20 slewably with respect to the support base 10.

The attachment 20 comprises a boom 21, an arm 22, a bucket 23, and a plurality of (in this embodiment, three) hydraulic cylinders 24a, 24b, 24c. Specifically, the boom 21 is a columnar strength member. The boom 21 has a base end which is pivotally supported by the support portions 13a in such a manner as to allow a distal end of the boom 21 on an opposite side of the base end to be swingably moved in the front-rear direction about the support portions 13a serving as a supporting point.

As with the boom 21, the arm 22 is a columnar strength member. The arm 22 has a base end which is pivotally supported by the distal end of the boom 21 in such a manner as to allow a distal end of the arm 22 to be swingably moved in the front-rear direction about the distal end of the boom 21 serving as a supporting point. The bucket 23 is a vessel-like member for excavating soil or the like. The bucket 23 has a base end which is pivotally supported by the distal end of the arm 22 in such a manner as to allow a distal end of the bucket 23 to be swingably moved in the front-rear direction about the distal end of the arm 22 serving as a supporting point.

The boom 21, the arm 22 and the bucket 23 are driven by the first hydraulic cylinder 24a, the second hydraulic cylinder 24b and the third hydraulic cylinder 24c, respectively. Specifically, the first hydraulic cylinder 24a for driving the boom 21 is installed to a vicinity of the base end of the boom 21. The second hydraulic cylinder 24b for driving the arm 22 is installed to a back surface of the boom 21. The third hydraulic cylinder 24c for driving the bucket 23 is installed to a back surface of the arm 22.

A plurality of hydraulic pipes 25 extending from the second hydraulic cylinder 24b and the third hydraulic cylinder 24c are installed to the boom 21. Terminal ends 25a of the hydraulic pipes 25 are collectively positioned at an intermediate position of the boom 21 in its longitudinal direction. A plurality of hydraulic hoses 50a having flexibility are connected to respective ones of the terminal ends 25a. A group of the hydraulic hoses 50a (hydraulic hose group 50) will be separately described in detail later.

The cab 30 is a box-shaped operator's room disposed on a left side of a front region of the machine body 3. Specifically, the cab 30 is installed on the left side deck 12, on a left side of and in adjacent relation to the pair of vertical plates 13, 13.

The equipment compartment 40 has a rear equipment compartment 41 located in a rear region of the machine body 3 to extend over the right-left direction, and a lateral equipment compartment 42 located on a right side of the front region of the machine body 3 to extend over the front-rear direction. The lateral equipment compartment 42 is installed on the right side deck 12, on a right side of and in adjacent relation to the pair of vertical plates 13, 13. The rear equipment compartment 41 and the lateral equipment compartment 42 are formed continuously and integrally.

Figure 3:
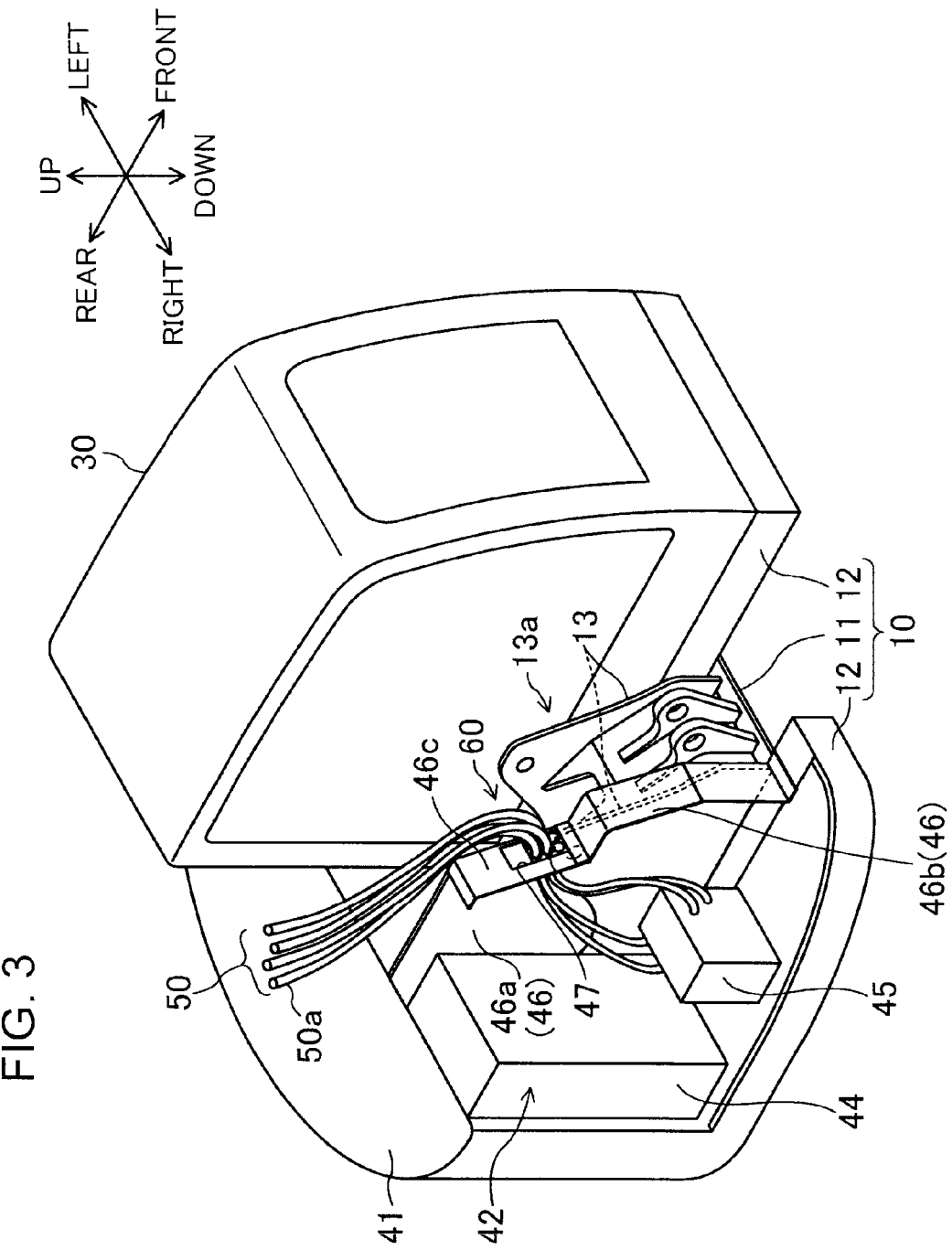
FIG. 3 is a schematic perspective view illustrating an inside of a lateral equipment compartment.

An engine, a hydraulic pump and other equipment (not illustrated) are installed in the rear equipment compartment 41. As illustrated in FIG. 3, a hydraulic oil tank 44, a control valve 45 and other equipment are installed in the lateral equipment compartment 42.

The hydraulic oil tank 44 is a box-shaped container for storing therein hydraulic oil for use in hydraulic control. In the embodiment, the hydraulic oil tank 44 is disposed in a rear region of the lateral equipment compartment 42. The control valve 45 is a device for performing hydraulic control according to operator's manipulation, in cooperation with the hydraulic oil tank 44 and the hydraulic pump. The hydraulic hose group 50 connects the control valve 45 with the second hydraulic cylinder 24b and the third hydraulic cylinder 24c. Through the hydraulic hose group 50, feeding and return of hydraulic oil are performed between the control valve 45 and each of the second hydraulic cylinder 24b and the third hydraulic cylinder 24c.

The lateral equipment compartment 42 comprises an equipment installation area which is an area provided on the right side deck 12 to allow the above equipment (hydraulic oil tank 44, control valve 45, etc.) to be installed therein, and a guard 42a covering the equipment installation area. As illustrated in FIG. 2, the guard 42a comprises a plurality of panels each composed of a steel plate, and has right and left lateral surfaces, front surface and an upper surface. As illustrated in FIG. 3, the panels of the guard 42a include a left panel 46. The left panel 46 is formed with an opening 47 for leading out the hydraulic hose group 50 therethrough.

Specifically, the left panel 46 has a flat plate-shaped lateral wall 46a located in adjacent relation to the left side of the right vertical plates 13 of the pair of vertical plates 13, 13 to cover a left side of the equipment installation area, and a front wall 46b protruding rightwardly from a front edge of the lateral wall 46a. The front wall 46b includes an inclined surface portion 46c which gradually inclines obliquely downwardly in a front direction, and the opening 47 is formed in the front wall 46b to have a rectangular shape which is long in the front-rear direction and in an up-down direction.

The hydraulic hose group 50 is led out from an inside of the lateral equipment compartment 42 through the opening 47 in such a manner as to extend upwardly, specifically, frontwardly and obliquely upwardly.

The hydraulic hose group 50 led out to the outside through the opening 47 is curved in an S shape. In this state, the hydraulic hoses 50a can be connected to corresponding ones of the hydraulic pipes 25. Particularly, a portion of the hydraulic hose group 50 close to the hydraulic pipes 25 is curved in a rearwardly convex shape (curved portion 51). When the boom 21 is raised and lowered, the hydraulic hose group 50 is also swingingly moved. However, a load to be applied to the hydraulic hose group 50 during the swing movement is reduced by forming the curved portion 51.

Further, a region of the hydraulic hose group 50 in a vicinity of the opening 46, to which a particularly strong load is applied, is securely supported by a clamp 60.

The clamp 60 is adapted to collectively support an intermediate portion of the hydraulic hose group 50. Each of the hydraulic hoses 50a in the hydraulic hose group 50 is securely supported by the clamp 60 in a posture where it extends approximately horizontally. The opening 47 is closed up by the clamp 60, which prevents rainwater and dust from intruding into the lateral equipment compartment 42 via the opening 47. That is, the clamp 60 has a shielding function of shielding the equipment installation area from the outside.

Figure 4B:
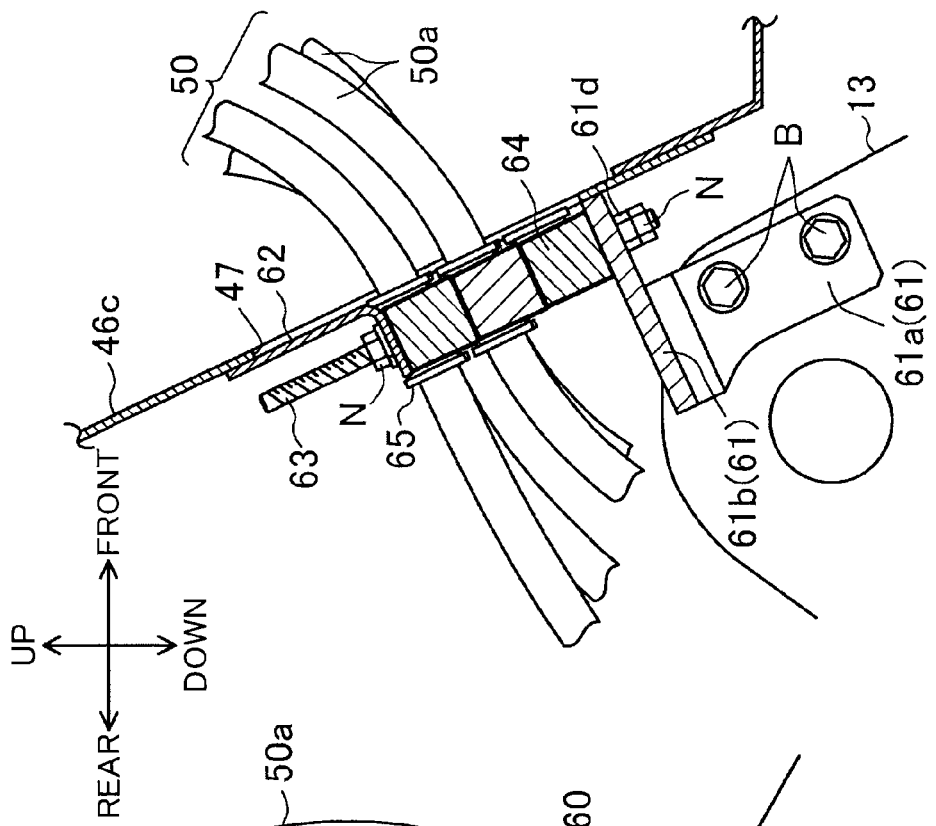
Figure 4A:
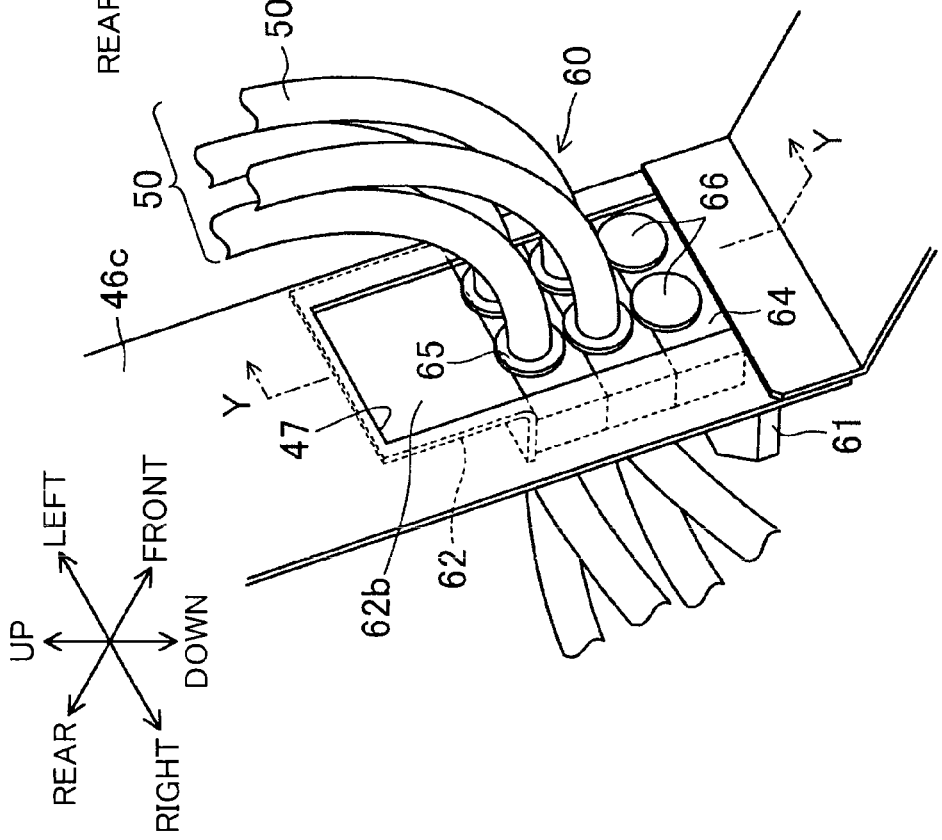
Figure 5:
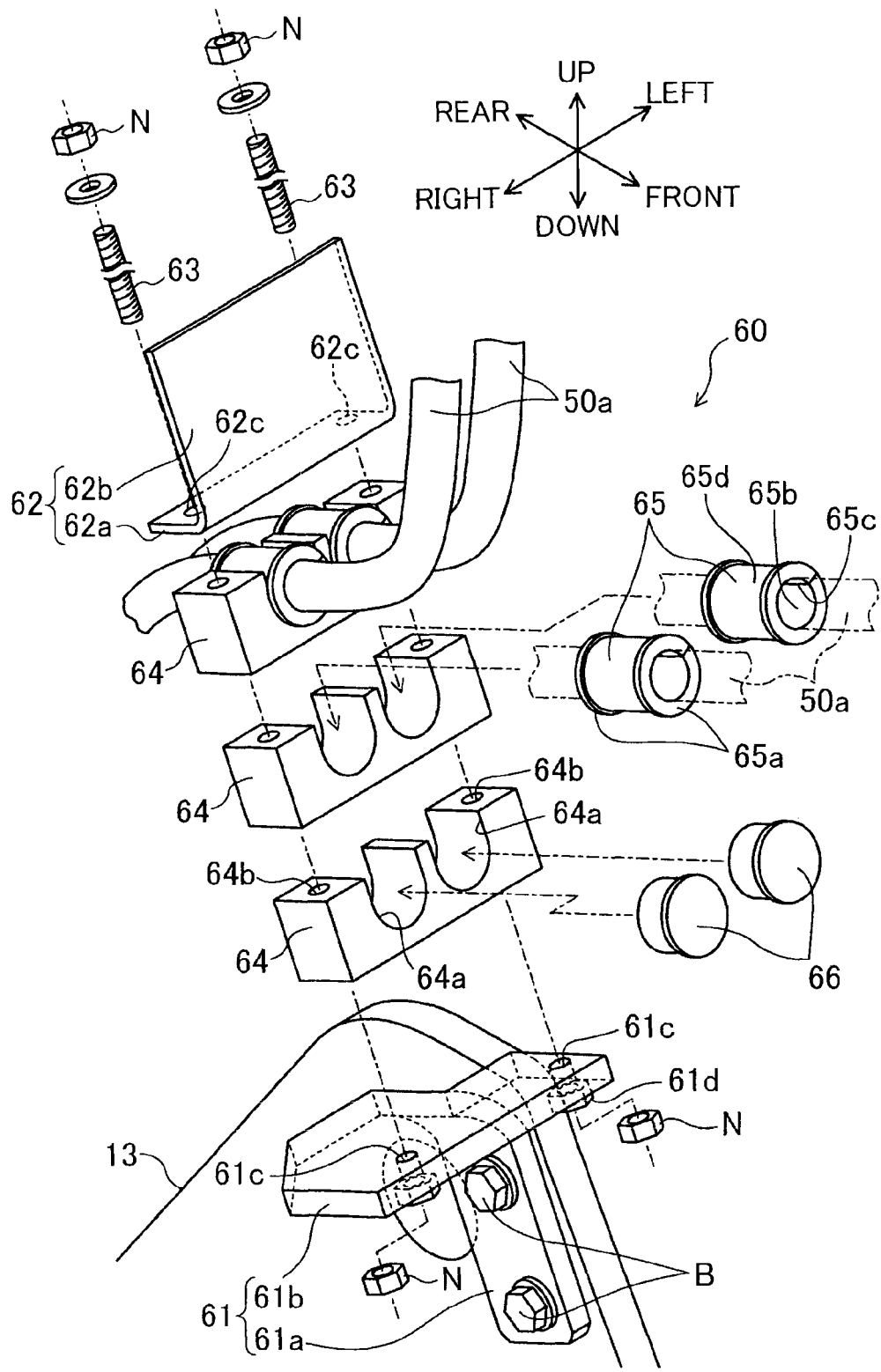
FIG. 5 is an exploded perspective view of the clamp.

FIGS. 4A and 4B and FIG. 5 illustrate the clamp 60. The illustrated clamp 60 comprises a support member 61 (one of a pair of clamping members), a plurality of support elements 64, a bushing 65, a presser member 62 (the remaining one of the pair of clamping members), and a pair of guide bars 63 (guide portion).

The support member 61 is a member prepared by subjecting a metal plate having a predetermined shape to bending. The support member 61 has an attaching portion 61a, and a support portion 61b having a plate surface approximately perpendicular to a plate surface of the attaching portion 61a.

The attaching portion 61a is fixed to the right vertical plate 13 as a strength member, by a bolt B, in a posture where the plate surface thereof is at right angle to the right-left direction. That is, the support member 61 is securely supported by the support base 10 and integrated with the support base 10.

The support portion 61b is disposed inside the inclined surface portion 46c, in a posture approximately perpendicular to the inclined surface portion 46c. The support portion 61b is brought in close contact with the inclined surface portion 46c in such a manner that an upper surface of the support portion 61b becomes flush with a lower edge of the opening 47. The support portion 61b is formed with a pair of first through-holes 61c penetrating through the support portion 61b in its thickness direction, at positions spaced apart from each other in the right-left direction. Further, the support portion 61b is provided with two fixed nuts 61d welded to a lower surface thereof at respective positions corresponding to the first through-holes 61c. Each of the first through-holes 61c and a hole of a corresponding one of the fixed nuts 61d are aligned and communicated with each other in the thickness direction of the support portion 61b.

Each of the plurality of support elements 64 is made of a material having a rigidity greater than that of the bushing 65, specifically, made of a metal or resin material excellent in rigidity, and formed to have a rectangular parallelepiped shape which is long in the right-left direction. In this embodiment, the plurality of support elements 64 consist of the following three identical support elements employed as standard equipment. The three support elements 64 are arranged side-by-side in a raw along an up-down direction. In this embodiment, a longitudinal dimension of the opening 47 is set to be approximately equal to a distance between upper and lower edges of an assembly obtained by arranging five support elements each identical to the support element 64, side-by-side in a row along the up-down direction.

The support element 64 has two fitting concave portions 64a, 64a formed to have the same inside dimension and arranged side-by-side in a row along the right-left direction. Each of the fitting concave portions 64a has a shape concaved from an upper surface toward a lower surface of the support element 64. More specifically, each of the fitting concave portions 64a has a U shape, when viewed rearwardly from the side of a front surface of the support element 64.

A dimension of the support element 64 in the right-left direction is set to be greater than a dimension of the opening 47 in the right-left direction (width or cross direction). The support element 64 has two element holes 64b each formed in a respective one of opposite ends thereof in the right-left direction at a position corresponding to a respective one of the first through-holes 61c.

The bushing 65 has a circular cylindrical-shaped bushing body 65d with a hose insertion hole 65b for allowing the hydraulic hose 50a to be penetratingly inserted thereinto, and two flanges 65a each protruding from a respective one of axially opposite ends of the bushing body 65d outwardly in a radial direction of the bushing body 65d. An axial dimension of the bushing body 65d is set to be slightly greater than a dimension of the support element 64 in the front-rear direction. The bushing 65 is made of a material having a rigidity less than the support element 64, specifically, made of a material having elasticity, such as rubber or synthetic resin, so that, when the bushing body 65d is pressed into the fitting concave portion 64a, it is fitted in the fitting concave portion 64a. The bushing body 65d is configured such that, when the bushing body 65d is fitted into the fitting concave portion 64a, one of the flanges 65a formed at a front end of the bushing body 65d is brought into contact with the front surface of the support element 64, and the other flange 65a formed at a rear end of the bushing body 65d is brought into contact with a rear surface of the support element 64.

Thus, in a state in which the bushing 65 is fitted in the support element 64, a displacement of the bushing 65 in the front-rear direction with respect to the support element 64 is restricted by the flanges 65a. In addition, a gap occurring between an inner surface of the fitting concave portion 64a and an outer surface the bushing body 65d is closed by the flanges 65a.

The bushing 65 is formed with a slit 65c for allowing the hydraulic hose 50a to be inserted into the hose insertion hole 65b from the side of the outer surface of the bushing 65. In this embodiment, four bushings each identical to the above bushing 65 are employed. Thus, each of one or more cap member 66 is fitted into each of a part (in this embodiment, two) of the fitting concave portions 64a devoid of the bushing 65 from the side of the front surface of the support element 64.

The presser member 62 is composed of a sectionally L-shaped plate member prepared by subjecting a metal plate to bending. The presser member 62 has a rectangular-shaped presser plate portion 62a, and a rectangular-shaped shield plate portion 62b having a plate surface approximately perpendicular to a plate surface of the presser plate portion 62a. The presser plate portion 62a has a shape approximately equal to the upper surface of the support element 64. The presser plate portion 62a has a pair of second through-holes 62c each formed at a position corresponding to a respective one of the element holes 64b.

The shield plate portion 62b extends upwardly from a front edge of the presser plate portion 62a. A dimension of the shield plate portion 62b in the right-left direction (cross direction) is set to be greater than the dimension of the opening 47 in the cross direction. On the other hand, a dimension of the shield plate portion 62b in an up-down direction (row direction of the support elements 64) is set to be greater than a dimension of one of the plurality of support elements 64 in the up-down direction, and less than a dimension of the opening 47 in the longitudinal direction thereof (up-down direction). In this embodiment, the dimension of the shield plate portion 62b in the up-down direction is set to be greater than a distance between upper and lower edges of an assembly obtained by arranging two support elements each identical to the support element 64, side-by-side in the row direction, and less than a distance between upper and lower edges of an assembly obtained by arranging three support elements each identical to the support element 64, side-by-side in the row direction.

The presser member 62 is installed to allow the shield plate portion 62b to extend along a back surface (lower surface) of the inclined surface portion 46c. In this state, the shield plate portion 62b is disposed in superimposed relation to the inclined surface portion 46c, to close up a remaining region of the opening 47 other than a region closed up by the plurality of (in this embodiment, three) support elements 64.

Each of the pair of guide bars 63 is composed of an elongate shaft-shaped member having two externally threaded portions each formed at a respective one of opposite ends thereof. A length of each of the guide bars 63 is set to be greater than a sum of a thickness of the support portion 61b, a thickness of the presser plate portion 62a, and a distance between upper and lower edges of an assembly obtained by arranging the plurality of support elements 64 side-by-side in the row direction under a condition that the number thereof is set within a specific value (in this embodiment, five). The length of each of the guide bars 63 in this embodiment is set to be slightly greater than the longitudinal dimension of the opening 47.

After the plurality of support elements 64 are arranged between the support portion 61*b* and the presser plate portion 62*a*, each of the guide bars 63 is inserted into a respective one of two sets of the first through-hole 61*c*, the element hole 64*b* and the second through-holes 62*c* which are aligned and communicated with each other. As a result of inserting the guide bars 63 into respective ones of the element holes 64*b*, the plurality of support elements 64 are positioned while being arranged side-by-side in the row direction.

Then, two nuts N are screwed, respectively, onto opposite ends of each of the guide bars 63 inserted in the respective sets of the first through-hole 61*c*, the element hole 64*b* and the second through-holes 62*c*, so that the plurality of support elements 64 arranged side-by-side in the row direction are clamped between the support portion 61*b* and the presser plate portion 62*a*.

In this clamp 60, the hydraulic hoses 50*a* can be easily installed, for example, in the following manner.

First of all, the hydraulic hose group 50 is led out from the lateral equipment compartment 42 to the outside through the opening 47. Then, the bushing 65 is attached to each of the hydraulic hoses 50*a* by inserting the hydraulic hose 50*a* into the hose insertion hole 65*b* through the slit 65*c*. The guide bars 63 are preliminarily attached to the support portion 61*b*.

Subsequently, in a posture allowing each of the fitting concave portions 64*a* to be opened upwardly and allowing the guide bars 63 to be inserted, respectively, into the right and left element holes 64*b*, a lowermost or first support element 64 is placed on the support portion 61*b* while inserting the guide bars 63, respectively, into the right and left element holes 64*b*. In this embodiment, the cap member 66 is fitted in each of the fitting concave portions 64*a* of the first support element 64.

Then, in the same manner as that for the first support element 64, a second support element 64 is placed on the first support element 64. Thus, the first and second support elements 64 are brought into close contact with each other while being arranged side-by-side in the row direction (axial direction of the guide bar 63). The bushing 65 holding the hydraulic hose 50*a* is fitted in each of the fitting concave portions 64*a* of the second support element 64.

As a result, the bushing body 65*d* is restricted from a displacement in the front-rear direction with respect to the second support element 64 by the flanges 65*a*, and right, left and lower regions of the outer surface of the bushing body 65*d* are supported by the second support element 64 excellent in rigidity. Thus, the bushing 65 is not easily detached from the second support element 64. This eliminates a need for manually supporting the hydraulic hose 50*a* during an operation of installing the hydraulic hose 50*a* to the second support element 64, so that it becomes possible to facilitate the operation of installing the hydraulic hose 50*a* to the second support element 64.

Subsequently, a third support element 64 is placed on the second support element 64. Thus, an upper side of the bushings 65 installed to the second support element 64 is closed up by the third support element 64, so that it becomes possible to prevent drop-out of the bushings 65 from the second support element 64. Then, the bushing 65 holding the hydraulic hose 50*a* is fitted in each of the fitting concave portions 64*a* of the third support element 64, in the same manner.

Finally, in a posture allowing the shield plate portion 62*b* to extend along the back surface of the inclined surface portion 46*c* and allowing the guide bars 63 to be inserted, respectively, into the right and left second through-holes 62*c*, the presser member 62 is superimposed on the third support element 64, and a nut N is fastened to a portion of each of the guide bars 63 protruding upwardly from a respective ones of the second through-holes 62*c*. As a result, the three support elements 64 arranged side-by-side in the row direction is securely clamped between the support portion 61*b* and the presser plate portion 62*a*, while holding the hydraulic hoses 50*a*.

In this state, a region of the opening 47 which is not closed up by the three support elements 64, i.e., a region of the opening 47 above the third support element 64, is closed up by the shield plate portion 62*b*.

Figure 6:
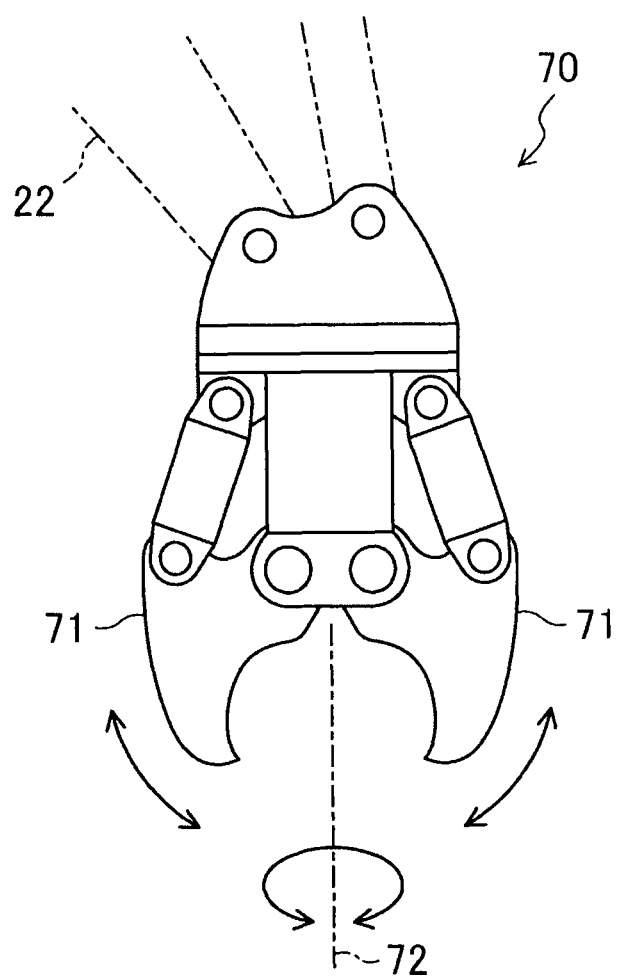
FIG. 6 is a schematic diagram illustrating one example of a replaceable attachment.

In the hydraulic shovel 1 according to this embodiment, a type or configuration of the attachment 20 can be changed according to intended purposes. For example, during demolition work in a recycling field, a crusher 70 as illustrated in FIG. 6 is employed in place of the bucket 23.

In this crusher 70, in addition to the swing movement in the front-rear direction, opening and closing movements of a pair of pinching portions 71, 71, and a rotational movement about a rotation axis 72, are performed by hydraulic control. Thus, in the case where the bucket 23 is replaced with the crusher 70, it is necessary to perform the addition of a hydraulic hose 50*a*. In addition to the case where the bucket 23 is changed to the crusher 70, when the number of actuators such as hydraulic cylinders is increased in connection with a change in configuration of the attachment 20, it is also necessary to perform the addition of a hydraulic hose 50*a*.

Therefore, the hydraulic shovel 1 according to this embodiment is preliminarily improved so as to facilitate the addition of a hydraulic hose 50*a*.

FIGS. 7A and 7B illustrate an example of the clamp 60 in the case where the addition of a hydraulic hose 50*a* is performed. In this example, four hydraulic hoses 50*a* are added to the example illustrated in FIGS. 4A and 4B and 5. In this case, the addition of hydraulic hoses 50*a* is performed, for example, in the following manner.

First of all, the nuts N fastened to respective ones of the upper portions of the guide bars 63 are unfastened, and the presser member 62 is detached. As a result, the plurality of support elements 64 are placed in a detachable state. Thus, the third and second support elements 64 are detached. Then, the cap members 66 fitted in respective ones of the fitting concave portions 64*a* of the first support element 64 are detached, and then two bushings 65 each having a hydraulic hose 50*a* inserted thereinto are press-fitted into respective ones of the fitting concave portions 64*a*. Subsequently, the second and third support elements 64 are arranged again. Then, a fourth support element 64 is arranged, and two bushings 65 each having a hydraulic hose 50*a* inserted thereinto are press-fitted into respective ones of fitting concave portions 64*a*, in the same manner as that described above. Finally, the presser member 62 is attached. In this way, the fourth support element 64 is newly arranged on the third support element 64 in a superimposed manner, so that it becomes possible to support eight hydraulic hoses 50*a*.

Due to the addition of the fourth support element 64, the shield plate portion 62*b* is moved upwardly along the inclined surface portion 46*c*. That is, according to an increase or decrease of the number of arranged support element 64, the shield plate portion 62*b* is moved in an up-down direction along the inclined surface portion 46*c*, so that a remaining region of the opening 47 other than a region closed up by the support elements 64 is reliably closed up by the shield plate portion 62*b*.

As above, a support element and a bushing each identical to a respective one of the existing support element 64 and bushing 65 may be added correspondingly to an increase in the number of hydraulic hoses 50*a*, so that it becomes possible to facilitate utilization of common components. In addition, even if the number of installed hydraulic hoses 50*a* is changed, the opening 47 can be always closed up by the presser plate portion 62*a*, so that it becomes possible to avoid large-scale design change. This makes it possible to facilitate the addition of a hydraulic hose 50*a*.

The working machine of the present invention is not limited to the above embodiment, but the present invention encompasses various other configurations.

Figure 8:
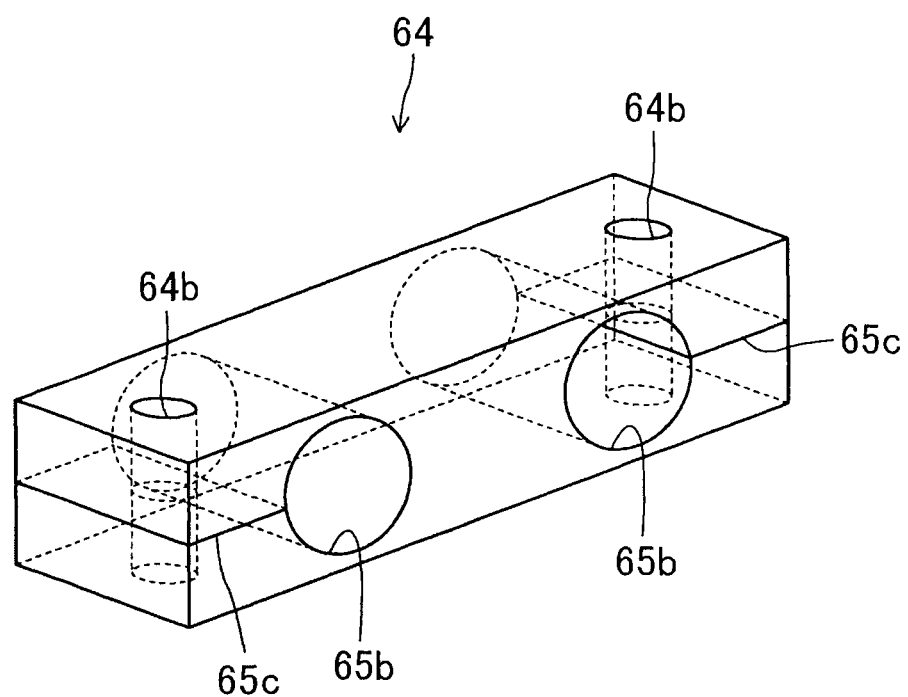
FIG. 8 is a schematic diagram illustrating an example of modification of a support element.

For example, as illustrated in FIG. 8, the support element 64 may additionally have the functions of the bushing 65. Specifically, the support element 64 may be made of an elastic material such as rubber, and formed to have the features of the bushing 65, i.e., formed with the hose insertion holes 65*b* and the slit 65*c*. This makes it possible to omit the bushing 65, thereby reducing the number of components.

The number of support elements 64 to be arranged, and the number of the fitting concave portions 64*a*, may be changed according to specifications of a working machine. For example, the number of the support element 64 may be one. The dimensions of the opening 47 may also be changed according to specifications of a working machine. The shape of the presser plate portion 62*a* may be arbitrarily set to an extent capable of closing up a remaining region of the opening 47 other than a region closed up by the plurality of support elements 64.

As long as the plurality of support elements 64 can be arranged side-by-side in the row direction, the configuration of the guide portion (guide bars 63) may be appropriately changed according to specifications of a working machine. For example, the element hole 64*b* may be a groove. Alternatively, concave and convex portions engageable with each other may be formed, respectively, in contact surfaces of two support elements 64 to allow the support elements 64 to be arranged side-by-side in the row direction while being positioned. Each of the guide bars 63 may be replaced with another one having a longitudinal dimension in conformity to the number of arranged support elements 64. The pipe is not limited to a hydraulic hose, but may be a metal pipe, for example.

It is not essential to integrally form the presser plate portion 62*a* and the shield plate portion 62*b* together. For example, the presser plate portion 62*a* and the shield plate portion 62*b* may be bolted to each other. In this structure, only the shield plate portion 62*b* can be replaced according to specifications of a working machine.

The above specific embodiment primarily includes an invention having the following features.

The working machine according to the above embodiment comprises: a lower propelling body; a support base supported by the lower propelling body; an equipment installation area provided on the support base to allow equipment to be installed therein; a pipe extending from the equipment installation area; a guard which covers the equipment installation area and has an opening for leading out the pipe therethrough; and a clamp configured to support the pipe and having a shape capable of closing up the opening, wherein the clamp includes: at least one support element for supporting the pipe; a guide portion for guiding the at least one support element so as to allow the at least one support element to be arranged side-by-side in a row along a specific direction; and a pair of clamping members for clamping the at least one support element from respective opposite sides in the specific direction, and wherein one of the pair of clamping members has a shield plate portion having a shape capable of closing up a remaining region of the opening other than a region closed up by the at least one support element arranged under a condition that the number thereof is set within a specific value.

In the above working machine, one of the pair of clamping members in the clamp has a shield plate portion, and the shield plate portion has a shape capable of closing up a remaining region of the opening other than a region closed up by the at least one support element arranged under a condition that the number thereof is set within a specific value. This makes it possible to facilitate the addition of a pipe, such as a hydraulic hose, without impairing a shielding function of shielding the equipment installation area.

Preferably, in the above working machine, the clamp further includes a bushing made of an elastic material and adapted to allow the pipe to be penetratingly inserted thereinto, wherein each of the at least one support element is made of a material having a rigidity greater than that of the bushing, and formed to have a fitting concave portion adapted to fit with the bushing.

In the working machine having this feature, the bushing in the clamp is made of an elastic material, and each of the at least one support element is made of a material having a rigidity greater than that of the bushing, so that it becomes possible to satisfy both suppression of deformation in each of the at least one support element, and adequate protection of a region of the pipe located in the fitting concave portion. Specifically, each of the at least one support element is made of a material having a rigidity greater than that of the bushing, so that it becomes possible to suppress deformation in each of the support elements caused by a clamping pressure produced when the pair of clamping members clamp the support elements therebetween. Further, the pipe is supported by the fitting concave portion via the bushing made of an elastic material without a direct contact with the support element, so that it becomes possible to prevent damage to the pipe due to friction between the pipe and the support element during swing movement of the pipe. In addition, the pipe is stably supported by the support element simply by penetratingly inserting the pipe into the bushing and then fitting the bushing with the pipe into the fitting concave portion. This eliminates a need for manually supporting the pipe during an operation of installing the pipe to the support element, so that it becomes possible to provide enhanced efficiency of installation of the pipe to the support element.

Preferably, the working machine according to the above embodiment further comprises: a vertical plate provided on the support base to stand vertically upwardly; and an attachment supported by the vertical plate raisably and lowerably with respect to the support base, wherein the pipe includes an hydraulic hose adapted to be supported by the at least one support element and to send hydraulic oil to the attachment therethrough, and the remaining one of the pair of clamping members is fixed to the vertical plate.

In this case, although a large load is applied to the clamp by a oscillation with raising and lowering movement of the hydraulic hose, since the remaining one of the pair of clamping members is fixed to the vertical plate as a strength member, the clamp is supported stably.

Preferably, in the working machine according to the above embodiment, a dimension of the shield plate portion in the specific direction is greater than a dimension of the at least one support element in the specific direction, and less than a dimension of the opening in the specific direction, and a dimension of the shield plate portion in a cross direction perpendicular to the specific direction is greater than a dimension of the opening in the cross direction.

Thus, the opening is reliably closed up by the at least one support element arranged under the condition that the number thereof is set within a specific value, and the shield plate portion.

This application is based on Japanese Patent application No. 2012-076654 filed in Japan Patent Office on Mar. 29, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A working machine comprising:
    a lower propelling body;
    a support base supported by the lower propelling body;
    an equipment installation area provided on the support base to allow equipment to be installed therein;
    a pipe extending from the equipment installation area;
    a guard which covers the equipment installation area and has an opening for leading out the pipe therethrough; and
    a clamp configured to support the pipe and having a shape capable of closing up the opening, the clamp including:
        at least one support element for supporting the pipe, the at least one support element having a shape allowing the pipe to pass through the at least one support element;
        a guide portion for guiding the at least one support element to be arranged in the opening to close up a region of the opening, wherein the opening has a dimension that is sufficient to accommodate at least one additional support element in the opening, so that the at least one support element and the at least one additional support element are arranged in a row along a specific direction at a time when the at least one support element is arranged in the opening, whereby there is a remaining region of the opening, between the at least one support element and an edge of the opening in the specific direction, that can accommodate the at least one additional support element and that is not closed up by the at least one support element; and
        a pair of clamping members for clamping the at least one support element arranged in the opening, from respective opposite sides of the support element in the specific direction,
    wherein one of the pair of clamping members that is at a side of the opening closest to said edge in said specific direction includes a shield plate portion aligned in the specific direction with an accommodating region of the opening, the accommodating region accommodating the at least one support element fully in a cross direction perpendicular to the specific direction,
    wherein the shield plate portion consists of a single plate component having a shape continuously extending in the specific direction,
    wherein the single plate component has a dimension in the specific direction that is greater than the dimension of the at least one additional support element in the specific direction, the dimension of the single plate component in the specific direction allowing the single plate component to entirely close up the remaining region of the opening by itself over the whole remaining region in the cross section in both a first state where only the at least one support element is arranged in the opening and in a second state where the at least one support element and the at least one additional support element are arranged together in the opening, and a dimension in the cross direction that is greater than a dimension of the opening in the cross direction.

2. The working machine as defined in claim 1, wherein the clamp further includes a bushing made of an elastic material and adapted to allow the pipe to be penetratingly inserted thereinto, and wherein each of the at least one support element is made of a material having a rigidity greater than that of the bushing, and is formed to have a fitting concave portion adapted to fit with the bushing.

3. The working machine as defined in claim 1, which further comprises:
    a vertical plate provided on the support base to stand vertically upwardly; and
    an attachment supported by the vertical plate raisably and lowerably with respect to the support base,
    wherein:
    the pipe includes a hydraulic hose adapted to be supported by the at least one support element and to send hydraulic oil to the attachment therethrough; and
    a remaining one of the pair of clamping members is fixed to the vertical plate.

4. The working machine as defined in claim 1, wherein the dimension of the single plate component in the specific direction is less than a dimension of the opening in the specific direction.

* * * * *